(12) United States Patent
Katou et al.

(10) Patent No.: US 8,718,902 B2
(45) Date of Patent: May 6, 2014

(54) CONTROL APPARATUS AND CONTROL METHOD OF MULTIPLE CYLINDER

(75) Inventors: Yuuichi Katou, Susono (JP); Tomohiro Shinagawa, Shizuoka-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 260 days.

(21) Appl. No.: 13/335,183

(22) Filed: Dec. 22, 2011

(65) Prior Publication Data

US 2012/0166070 A1  Jun. 28, 2012

(30) Foreign Application Priority Data

Dec. 27, 2010  (JP) .................................. 2010-290896

(51) Int. Cl.
*F02D 41/14* (2006.01)
*F02D 41/04* (2006.01)

(52) U.S. Cl.
USPC ....................... 701/103; 123/698; 123/568.21

(58) Field of Classification Search
USPC ............ 123/672, 673, 692, 698, 703, 568.11, 123/568.21, 568.12; 701/103, 104, 108; 73/114.72, 114.73, 114.74, 114.75, 73/114.77
See application file for complete search history.

(56) References Cited

U.S. PATENT DOCUMENTS

| 7,783,408 B2 | 8/2010 | Teraya |
| 8,047,064 B2 | 11/2011 | Iwazaki et al. |
| 2012/0226430 A1* | 9/2012 | Shinagawa et al. ........... 701/104 |

FOREIGN PATENT DOCUMENTS

| JP | 2009121423 A | 6/2009 |
| JP | 2009156216 A | 7/2009 |
| JP | 2009203881 A | 9/2009 |
| JP | 2010071136 A | 4/2010 |

* cited by examiner

*Primary Examiner* — Mahmoud Gimie
(74) *Attorney, Agent, or Firm* — Gifford, Krass, Sprinkle, Anderson & Citkowski, P.C.

(57) ABSTRACT

With a control apparatus of a multiple cylinder internal combustion engine, external EGR that circulates exhaust gas in an exhaust passage to an intake passage is executed, and an air-fuel ratio is feedback-controlled such that an air-fuel ratio of the exhaust gas comes to match a predetermined target air-fuel ratio. When a rich deviation in which the air-fuel ratio of a portion of cylinders is off to a rich side from the target air-fuel ratio is detected, a parameter indicative of an amount of the rich deviation is calculated. The target air-fuel ratio is corrected to the rich side according to the calculated parameter. A value of a parameter at which the rich correction is started is changed according to whether external EGR is being executed.

9 Claims, 12 Drawing Sheets

CONTROL APPARATUS AND CONTROL METHOD OF MULTIPLE CYLINDER

CROSS-REFERENCE TO RELATED APPLICATIONS

This application claims priority to Japanese Patent Application No. 2010-290896 filed on Dec. 27, 2010, which is incorporated herein by reference in its entirety including the specification, drawings and abstract.

BACKGROUND OF THE INVENTION

1. Field of the Invention

The invention relates to a control apparatus and a control method of a multiple cylinder internal combustion engine. More particularly, the invention relates to a control apparatus and a control method of a multiple cylinder internal combustion engine, that are capable of executing external EGR that circulates exhaust gas in an exhaust passage to an intake passage.

2. Description of Related Art

It is known that the amount of NOx that is produced can be suppressed by reducing the combustion rate and combustion temperature by executing external EGR. It is also known that, in an internal combustion engine provided with a catalyst, for example, air-fuel ratio feedback control to bring the air-fuel ratio of the air-fuel mixture, and thus the exhaust gas, close to a predetermined target air-fuel ratio is performed in order to efficiently purify the toxic components in the exhaust gas with the catalyst.

SUMMARY OF THE INVENTION

In a multiple cylinder internal combustion engine, the fuel injection system of a portion of cylinders may fail, for example, and as a result, the fuel injection quantity for this portion of cylinders may become greater than the fuel injection quantity for the remaining cylinders, resulting in variation in the air-fuel ratio among cylinders. If air-fuel ratio feedback control is performed at this time, the air-fuel ratio of the normal cylinders will be corrected to the lean side, so the amount of NOx discharged from the normal cylinders will increase.

Therefore, it is conceivable to correct a target air-fuel ratio of the air-fuel ratio feedback control to the rich side to suppress the amount of NOx that is discharged from the normal cylinders.

However, the results of the research conducted by the inventors reveals that it is not preferable to perform a rich correction when external EGR is being executed, in the same way as when external EGR is not being executed.

This invention thus provides a control apparatus and a control method of a multiple cylinder internal combustion engine, that are capable of performing a suitable rich correction when there is variation in the air-fuel ratio among cylinders.

A first aspect of the invention relates to a control apparatus of a multiple cylinder internal combustion engine, that includes an EGR apparatus that executes external EGR that circulates exhaust gas inside of an exhaust passage to an intake passage; an air-fuel ratio control apparatus that feedback-controls an air-fuel ratio such that an air-fuel ratio of the exhaust gas comes to match a predetermined target air-fuel ratio; a detecting device that detects a rich deviation in which an air-fuel ratio of a portion of cylinders is off to a rich side from the target air-fuel ratio; a calculating device that calculates a parameter indicative of an amount of the rich deviation, when the rich deviation is detected by the detecting device; a rich correcting device that corrects the target air-fuel ratio to the rich side according to the parameter calculated by the calculating device; and a changing device that changes a value of the parameter at which the rich correction is started, according to whether the external EGR is being executed.

The changing device may make the value of the parameter at which the rich correction is started larger when the external EGR is being executed than when the external EGR is not being executed.

The changing device may change the rich correction amount of the rich correction according to whether the external EGR is being executed and the value of the parameter.

The changing device may make the rich correction amount with respect to the parameter smaller when the external EGR is being executed than when the external EGR is not being executed.

The changing device may change the rich correction amount according to an external EGR rate when the external EGR is being executed.

The changing device may make the rich correction amount smaller as the external EGR rate increases.

The control apparatus may also include a variable device that varies an overlap of an intake valve and an exhaust valve, and the changing device may change the rich correction amount according to the overlap when the external EGR is not being executed.

The changing device may make the rich correction amount smaller as the overlap increases.

A second aspect of the invention relates to a control method of a multiple cylinder internal combustion engine, that includes executing external EGR that circulates exhaust gas in an exhaust passage to an intake passage; feedback-controlling an air-fuel ratio such that an air-fuel ratio of the exhaust gas comes to match a predetermined target air-fuel ratio; detecting a rich deviation in which an air-fuel ratio of a portion of cylinders is off to a rich side from the target air-fuel ratio; calculating a parameter indicative of an amount of the rich deviation, when the rich deviation is detected; correcting the target air-fuel ratio to the rich side according to the calculated parameter; and changing a value of the parameter at which the rich correction is started, according to whether the external EGR is being executed.

This invention displays the excellent effect of being able to perform a suitable rich correction when there is variation in the air-fuel ratio among cylinders.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
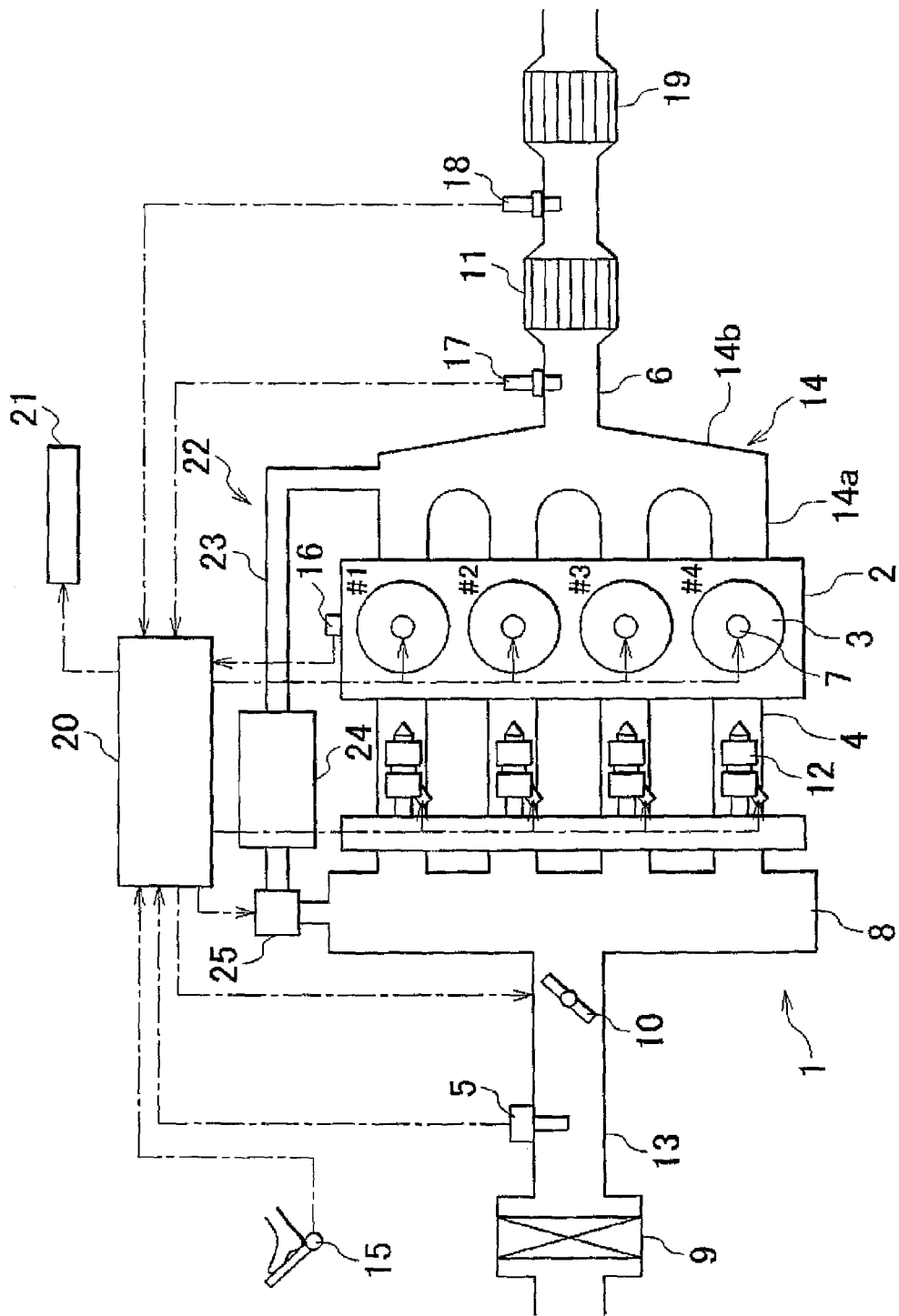
FIG. 1 is a schematic diagram of an internal combustion engine according to an example embodiment of the invention.

FIG. 1 is a schematic diagram of an internal combustion engine according to an example embodiment of the invention. As shown in the drawing, an internal combustion engine (i.e., an engine) 1 generates power by burning a mixture of air and fuel inside a combustion chamber 3 formed in a cylinder block 2. The force generated by the combustion of this air-fuel mixture moves a piston in the combustion chamber 3 back and forth. The internal combustion engine 1 in this example embodiment is a multiple cylinder internal combustion engine that is mounted in a vehicle. More specifically, the internal combustion engine 1 is an in-line 4-cylinder spark ignition internal combustion engine. The internal combustion engine 1 has cylinders #1 to #4. However, the number and configuration of the cylinders is not particularly limited.

Although not shown, an intake valve that opens and closes an intake port, and an exhaust valve that opens and closes an exhaust port, are provided for each cylinder in a cylinder head of the internal combustion engine 1. Each intake valve and each exhaust valve is driven open and closed by a valve actuating mechanism that includes a camshaft. A spark plug 7 for igniting the air-fuel mixture in the combustion chamber 3 is mounted in each cylinder, at the top portion of the cylinder head.

A variable valve mechanism 21 that changes the opening and closing characteristics of each valve is employed as the valve actuating mechanism for the intake valves and the exhaust valves. A variable valve timing mechanism that changes the opening and closing timing of the intake valves in all of the cylinders uniformly by changing the rotation phase of the camshaft with respect to the crankshaft is provided on the intake valve side. Also, a similar variable valve timing mechanism is also provided on the exhaust valve side. The variable valve mechanism 21 is formed by these variable valve timing mechanisms. A well-known structure may be used for these variable valve timing mechanisms.

The overlap of the intake valves and the exhaust valves is able to be changed by this variable valve mechanism 21. The overlap may be changed by providing a variable valve timing mechanism on only one of the intake valve side and the exhaust valve side. A mechanism that can change the operation angle and lift may also be employed as the variable valve mechanism 21.

The intake port of each cylinder is connected to a surge tank 8 that serves as an intake collection chamber, via a branch pipe 4 of each cylinder. An intake pipe 13 is connected to an upstream side of the surge tank 8, and an air cleaner 9 is provided on an upstream end of the intake pipe 13. Also, an airflow meter 5 for detecting the intake air amount and an electronically controlled throttle valve 10 are incorporated, in order from the upstream side, into the intake pipe 13. The intake port, the branch pipe 4, the surge tank 8, and the intake pipe 13 together form an intake passage.

An injector (i.e., a fuel injection valve) 12 that injects fuel into the intake passage, or more particularly, into the intake port, is provided for each cylinder. The fuel that is injected from the injector 12 mixes with the intake air to form an air-fuel mixture. This air-fuel mixture is drawn into the combustion chamber 3 when the intake valve opens, and is then compressed by the piston, ignited by the spark plug 7, and combusted.

Meanwhile, the exhaust port of each cylinder is connected to an exhaust manifold 14. This exhaust manifold 14 includes a branch pipe 14a for each cylinder and an exhaust collection portion 14b. The branch pipe 14a forms the upstream portion of the exhaust manifold 14, and the exhaust collection portion 14b forms the downstream portion of the exhaust manifold 14. An exhaust pipe 6 is connected to the downstream side of the exhaust collection portion 14b. The exhaust port, the exhaust manifold 14, and the exhaust pipe 6 together form an exhaust passage.

Catalysts that are three-way catalysts, i.e., an upstream catalyst 11 and a downstream catalyst 19, are arranged in series on the upstream and downstream sides, respectively, of the exhaust pipe 6. First and second air-fuel ratio sensors, i.e., a sensor 17 in front of the catalyst (also referred to as a "catalyst upstream sensor" in the specification) and a catalyst in back of the catalyst 18 (also referred to as a "catalyst downstream sensor" in this specification), for detecting the air-fuel ratio of the exhaust gas are arranged on the upstream and downstream sides, respectively, of the upstream catalyst 11. The catalyst upstream sensor 17 and the catalyst downstream sensor 18 are arranged in positions directly in front and in back of the upstream catalyst 11, and detect the air-fuel ratio based on the oxygen concentration in the exhaust gas. In this way, a single catalyst upstream sensor 17 is arranged at an exhaust merging portion on the upstream side of the upstream catalyst 11.

An EGR apparatus 22 is provided in the engine 1. The EGR apparatus 22 is designed to execute external EGR that circulates exhaust gas inside the exhaust passage to the intake passage. The EGR apparatus 22 includes an EGR passage 23 that connects the exhaust collection portion 14b of the exhaust manifold 14 with the surge tank 8, and an EGR cooler 24 and an EGR valve 25 provided in order from the upstream side in this EGR passage 23. The EGR cooler 24 cools the exhaust gas taken from the exhaust passage, i.e., the EGR gas. The EGR valve 25 opens and closes to regulate the amount of EGR gas that flows through the EGR passage 23.

The spark plug 7, the throttle valve 10, the injector 12, the variable valve mechanism 21, and the EGR valve 25 are electrically connected to an electronic control unit (hereinafter referred to as "ECU") 20 that serves as a control apparatus. The ECU 20 includes a CPU, ROM, RAM, an input/output port, and a storage device, and the like, none of which are shown. Also, as shown in the drawing, the ECU 20 is connected to a crank angle sensor 16 that detects a crank angle of the internal combustion engine 1, an accelerator operation amount sensor 15 that detects an accelerator operation amount, and other various sensors, in addition to the airflow meter 5, the catalyst upstream sensor 17, and the catalyst downstream sensor 18 described above, via an A/D converter and the like, not shown. The ECU 20 controls the ignition timing, the fuel injection quantity, the fuel injection timing, the throttle opening amount, the opening and closing timing and overlap of the intake and exhaust valves, and the EGR gas amount and the like by controlling the spark plug 7, the throttle valve 10, the injector 12, the variable valve mechanism 21, and the EGR valve 25 based on the detection values from the various sensors and the like to obtain the desired output.

The ECU 20 detects the crank angle itself based on a crank pulse signal from the crank angle sensor 16, and then discriminates the cylinders and calculates the speed of the engine 1. The term "speed" refers to the number of revolutions per unit of time, and is synonymous with rotation speed. In this example embodiment, the speed refers to the number of revolutions per minute rpm. Also, the ECU 20 normally controls the throttle opening amount according to the accelerator operation amount.

Figure 2:
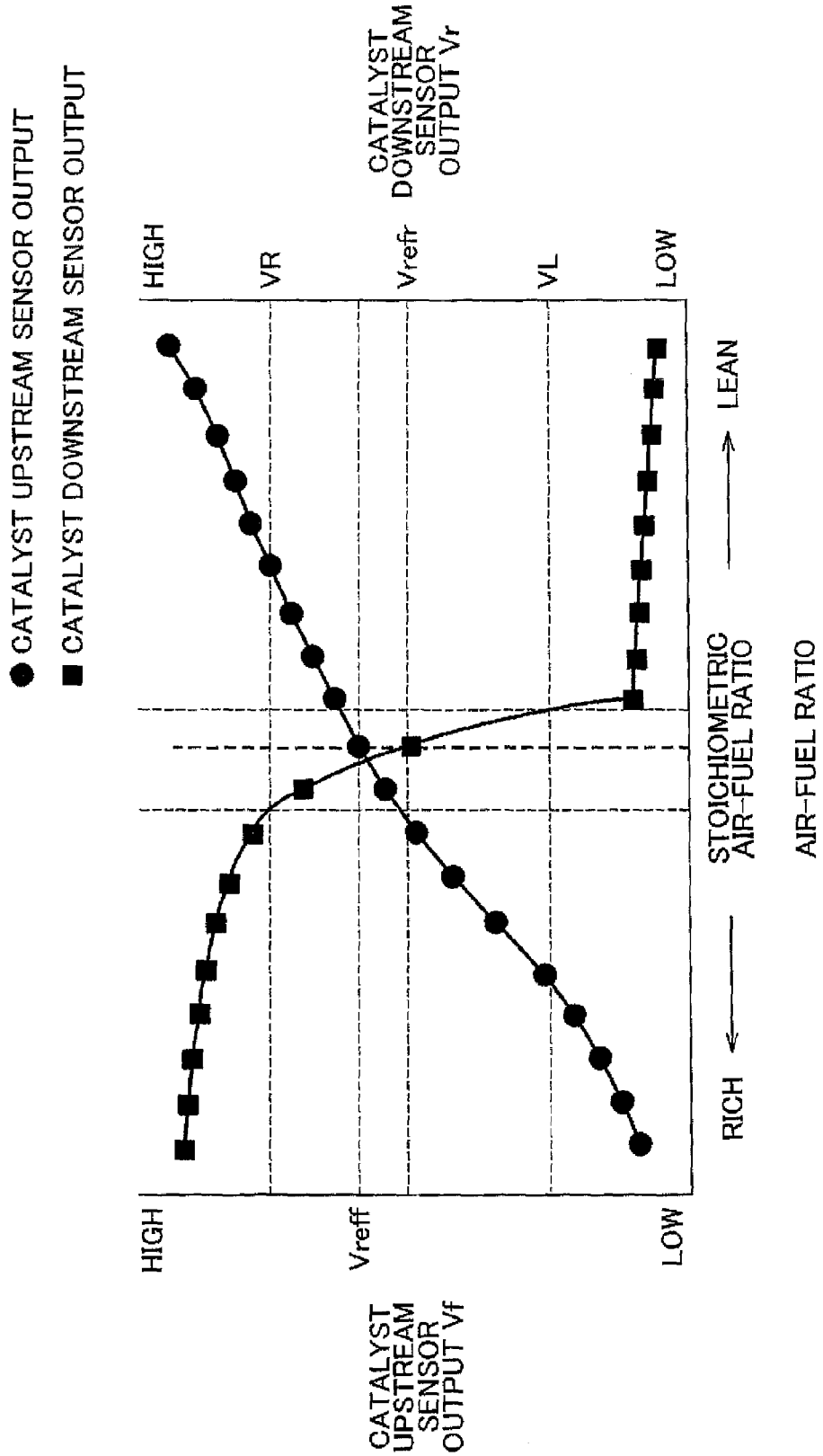
FIG. 2 is a graph showing output characteristics of a catalyst upstream sensor and a catalyst downstream sensor.

The catalyst upstream sensor 17 is a so-called wide-range air-fuel ratio sensor and is capable of continuously detecting the air-fuel ratio over a relatively wide range. The output characteristic of the catalyst upstream sensor 17 is shown in FIG. 2. As shown in the drawing, the catalyst upstream sensor 17 outputs a voltage signal Vf of a magnitude proportional to the exhaust gas air-fuel ratio. The output voltage when the exhaust gas air-fuel ratio is stoichiometric (i.e., a stoichiometric air-fuel ratio; for example A/F=14.5) is Vreff (approximately 3.3 V, for example).

On the other hand, the catalyst downstream sensor 18 is a so-called $O_2$ sensor that has a characteristic in which the output value changes suddenly at stoichiometric. The output characteristic of the catalyst downstream sensor 18 is shown in FIG. 2. As shown in the drawing, the output voltage when the exhaust gas air-fuel ratio is stoichiometric, i.e., a stoichiometric corresponding value, is Vrefr (0.45 V, for example). The output voltage of the catalyst downstream sensor 18 changes within a predetermined range (such as 0 to 1 V). When the exhaust gas air-fuel ratio is leaner than stoichiometric, the output voltage of the catalyst downstream sensor 18 is lower than the stoichiometric corresponding value Vrefr, and when the exhaust gas air-fuel ratio is richer than stoichiometric, the output voltage of the catalyst downstream sensor 18 is higher than the stoichiometric corresponding value Vrefr.

The upstream catalyst 11 and the downstream catalyst 19 both simultaneously purify NOx, HC, and CO, all of which are toxic components in the exhaust gas, when the air-fuel ratio A/F of the exhaust gas that flows into the upstream catalyst 11 and the downstream catalyst 19 is near stoichiometric. The range (i.e., the window) of the air-fuel ratio within which these components are able to be simultaneously purified efficiently is relatively narrow.

Therefore, air-fuel ratio control (i.e., stoichiometric control) is executed by the ECU 20 such that the air-fuel ratio of the exhaust gas that flows into the upstream catalyst 11 is controlled to near stoichiometric. This air-fuel ratio control includes both main air-fuel ratio control (i.e., main air-fuel ratio feedback control) that brings the exhaust gas air-fuel ratio detected by the catalyst upstream sensor 17 to match the stoichiometric air-fuel ratio that is a predetermined target air-fuel ratio, and auxiliary air-fuel ratio control (i.e., auxiliary air-fuel ratio feedback control) that brings the exhaust gas air-fuel ratio detected by the catalyst downstream sensor 18 to match the stoichiometric air-fuel ratio.

Meanwhile, EGR control is performed by the method described below. First, the ECU 20 determines whether EGR can be executed, referencing a map such as that shown in FIG. 3, based on detected actual engine parameters (such as the engine speed and engine load). When the actual engine parameters are within EGR execution region I, the ECU 20 determines that EGR should be executed, and opens the EGR valve 25. On the other hand, when the actual engine parameters are within EGR non-execution region II, the ECU 20 determines that EGR should not be executed, and fully closes the EGR valve 25.

When it is determined that EGR should be executed, the ECU 20 determines a target EGR rate according to a map, not shown, in which the relationship between the engine parameters and the target EGR rate has been defined in advance. The ECU 20 then controls the opening amount of the EGR valve 25 such that the determined target EGR rate is actually realized.

Maps for fuel injection quantity, fuel injection timing, and ignition timing are switched according to whether EGR is being executed, so the values of these with respect to given engine parameters are different when EGR is not being executed than they are when EGR is being executed.

As described above, in the multiple cylinder internal combustion engine of this example embodiment, the fuel injection system (the injector 12, in particular) of a portion of cylinders (one cylinder, in particular) may fail, for example, and as a result, the fuel injection quantity for this portion of cylinders may become greater than the fuel injection quantity for the remaining cylinders, resulting in variation (i.e., an imbalance) in the air-fuel ratio among cylinders. For example, the fuel injection quantity for cylinder #1 may become greater than the fuel injection quantities for cylinders #2, #3, and #4, and as a result, the air-fuel ratio may be off (i.e., deviate) greatly to the rich side.

At this time as well, if a relatively large correction amount is applied by the main air-fuel ratio feedback control described above, the air-fuel ratio of the total gas (i.e., the merged exhaust gas from all of the cylinders) that is supplied to the catalyst upstream sensor 17 can be controlled to stoichiometric. However, when the cylinders are viewed separately, it is evident that cylinder #1 becomes much richer than stoichiometric, and cylinders #2, #3, and #4 become leaner than stoichiometric, resulting in only the overall balance being stoichiometric, which is undesirable in view of emissions.

Figure 4:
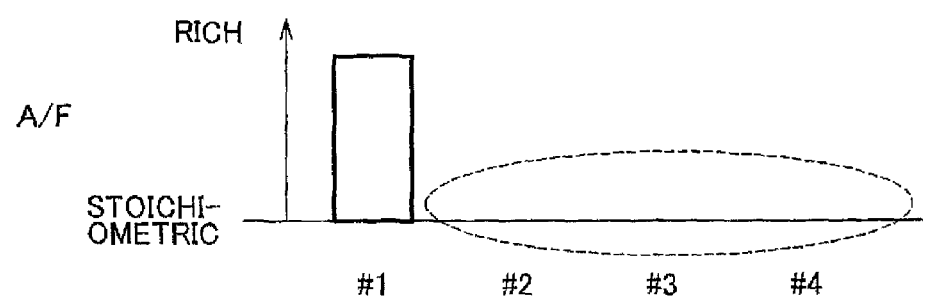
FIG. 4 is a graph showing the air-fuel ratio of each cylinder when there is an air-fuel ratio imbalance.

FIG. 4 is a view of the air-fuel ratio A/F of each cylinder when there is an air-fuel ratio imbalance. In this example, there is an abnormality in cylinder #1, in which the air-fuel ratio is far off to the rich side of stoichiometric due to the fuel injection quantity being excessive, for example. That is, there is a rich deviation in cylinder #1.

On the other hand, the remaining cylinders, i.e., cylinders #2, #3, and #4, that are shown in the circle, are normal so the air-fuel ratio is stoichiometric. That is, there is no rich deviation in cylinders #2, #3, and #4.

In cylinder #1, the ratio imbalance is such that there is a rich deviation of +20%. The ratio imbalance (%) in this case is a parameter that indicates the magnitude of the air-fuel ratio deviation with respect to a reference air-fuel ratio (in this example embodiment, stoichiometric that is the target air-fuel ratio). When the ratio imbalance is designated IB, the air-fuel ratio of the cylinder with the air-fuel ratio deviation (i.e., the cylinder with the imbalance) is designated Zib, and the reference air-fuel ratio is designated Zb, the ratio imbalance IB can be expressed by Expression (1) below.

$$IB = \frac{Zb - Zib}{Zb} \times 100(\%) \tag{1}$$

As the absolute value of the ratio imbalance increases, the air-fuel ratio deviation becomes larger and the degree of the air-fuel ratio imbalance increases.

The air-fuel ratio of cylinder #1 that is the cylinder with the rich deviation is 14.5×0.8=11.6. In contrast, in the normal cylinders (i.e., cylinders #2, #3, and #4), the ratio imbalance is 0% and the air-fuel ratio is 14.5.

Figure 5:
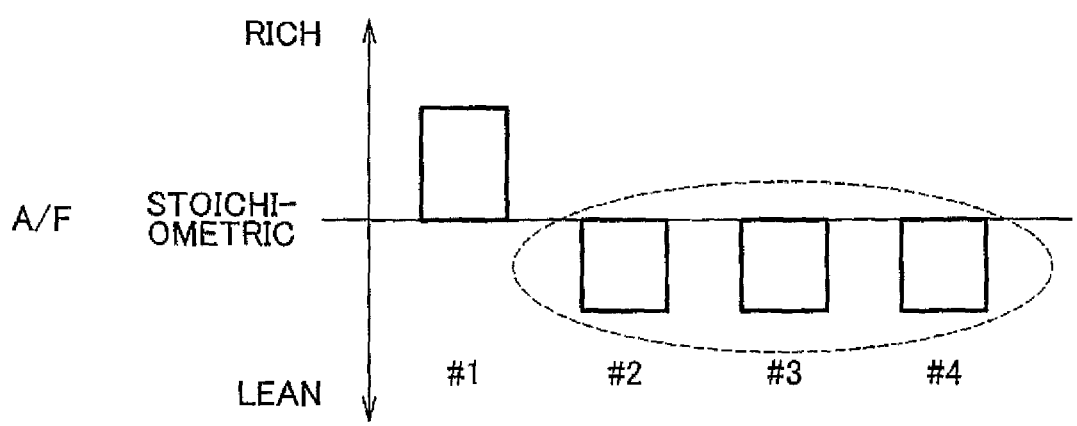
FIG. 5 is a graph showing the air-fuel ratio of each cylinder after main air-fuel ratio feedback control has been performed a predetermined period of time after the air-fuel ratio imbalance occur has occurred.

FIG. 5 is a graph showing the air-fuel ratio A/F of each cylinder after the main air-fuel ratio feedback control has been performed a predetermined period of time after the air-fuel ratio imbalance has occurred. As a result of performing the main air-fuel ratio feedback control, the air-fuel ratio of each cylinder is corrected to have a ratio imbalance of 5% to the lean side. The air-fuel ratio of cylinder #1 is 12.2, and the air-fuel ratios of the normal cylinders are 15.3.

Consequently, the air-fuel ratios of the normal cylinders become leaner than stoichiometric, such that the amount of NOx discharged (i.e., the NOx discharge amount) from the normal cylinders increases, which is problematic.

Figure 6:
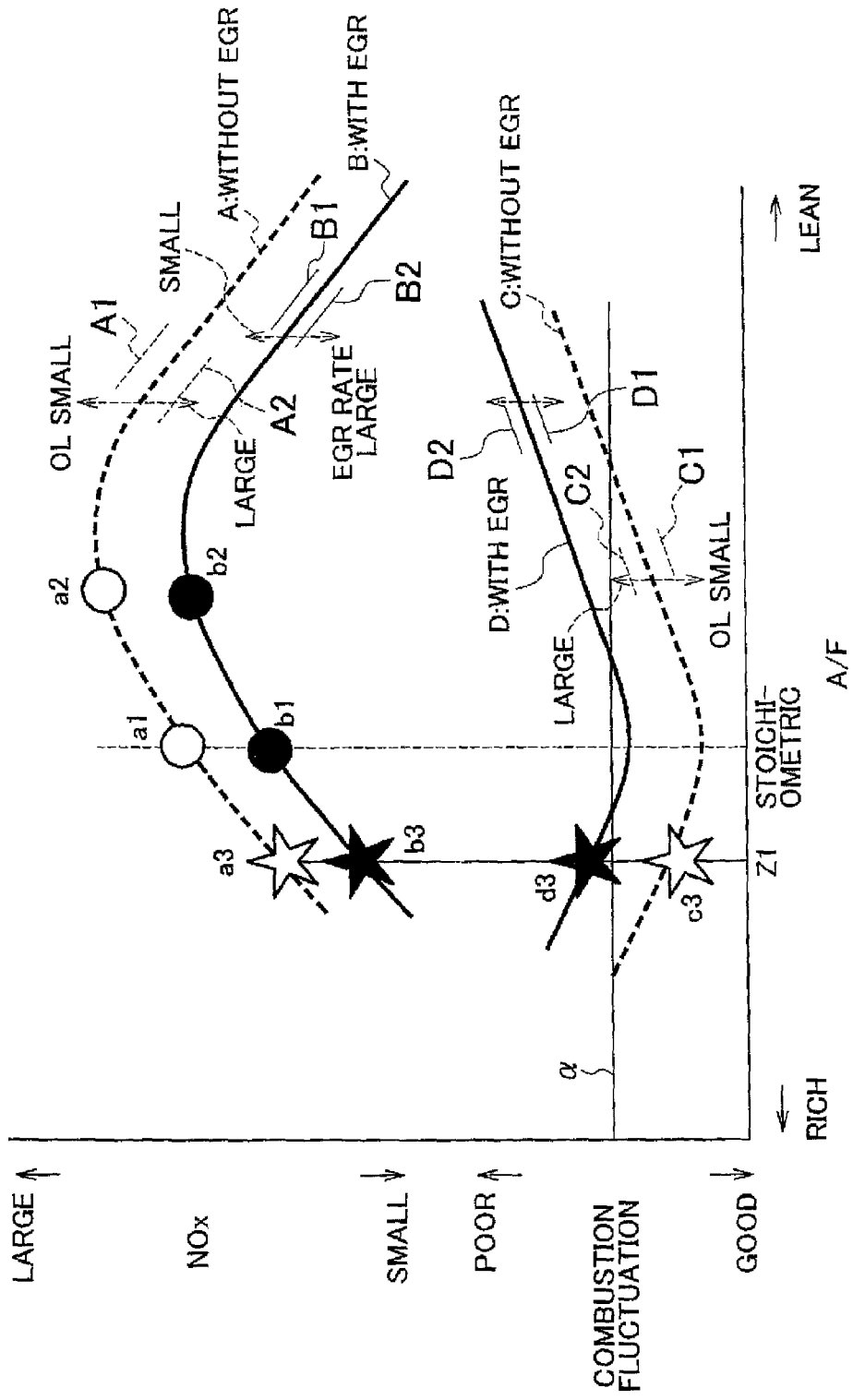
FIG. 6 is a graph showing the change characteristics of combustion fluctuation and the NOx discharge amount with respect to the air-fuel ratio.

FIG. 6 is a graph showing the change characteristics of combustion fluctuation and the NOx discharge amount with respect to the air-fuel ratio A/F. Line A denotes the NOx discharge amount change characteristic when external EGR is not being executed, line B denotes the NOx discharge amount change characteristic when external EGR is being executed, line C denotes the combustion fluctuation change characteristic when external EGR is not being executed, and line D denotes the combustion fluctuation change characteristic when external EGR is being executed.

Combustion fluctuation in this case refers to the change in the combustion state among cylinders. This appears as a change in the engine torque. The combustion state of each cylinder is preferably even, at which time the engine torque fluctuation is small and the combustion fluctuation is good. In contrast, a state in which the combustion fluctuation is poor is a state in which the combustion states of the cylinders are uneven and varied, and there is increased engine torque fluctuation. When there is an air-fuel ratio imbalance, the combustion state of each cylinder is also unbalanced (i.e., varies), and combustion fluctuation deteriorates.

As shown by line A (i.e., the broken line), the NOx discharge amount change characteristic when EGR is not being executed is a characteristic in which the maximum peak is at a predetermined air-fuel ratio that is leaner than stoichiometric. Also, as shown by line B (i.e., the solid line), the NOx discharge amount change characteristic when external EGR is being executed is a characteristic in which the line A makes a parallel shift as it is to the low NOx side. This is because when external EGR is executed, the combustion rate and the combustion temperature consequently decrease, so the NOx discharge amount decreases.

In contrast, as shown by line C (i.e., the broken line), the combustion fluctuation change characteristic when EGR is not being executed is a characteristic in which the minimum peak is at stoichiometric. Also, as shown by line D (i.e., the solid line), the combustion fluctuation change characteristic when external EGR is being executed is a characteristic in which the line C makes a parallel shift as it is in the direction in which the combustion fluctuation deteriorates. This is because when external EGR is executed, the combustion rate and the combustion temperature consequently decrease, so the combustion state becomes unstable.

Focusing on line A, for example, plot a1 (a white circle) on the line indicates the NOx discharge amount when the air-fuel ratio of the normal cylinders is the stoichiometric air-fuel ratio as shown in FIG. 4. In contrast, plot a2 (a white circle) on the line indicates the NOx discharge amount when the air-fuel ratio of the normal cylinders is lean as shown in FIG. 5. As is evident from this as well, the NOx discharge amount of the normal cylinders increases when the main air-fuel ratio feedback control is performed after an air-fuel ratio imbalance has occurred.

In the characteristics of the catalysts 11 and 19, the purification window on the lean side of stoichiometric is narrower than the purification window on the rich side of stoichiometric, so when there is a lean deviation of the exhaust gas air-fuel ratio, the NOx purification rate of the catalysts 11 and 19 declines significantly.

Therefore, in order to suppress an increase in the NOx discharge amount from the normal cylinders, the target air-fuel ratio of the main (and auxiliary) air-fuel ratio feedback control is corrected slightly to the rich side (i.e., a slight rich correction), so that the average air-fuel ratio of all of the cylinders is slightly richer than stoichiometric. Accordingly, the air-fuel ratio of the normal cylinders can be made richer than when a rich correction is not performed, so an increase in the NOx discharge amount can be suppressed.

In FIG. 6, plot a3 (a white star) on line A simply indicates the NOx discharge amount from all of the cylinders when external EGR is not being executed and the target air-fuel ratio is corrected to a predetermined value Z1 (such as 14.3) that is slightly richer than stoichiometric. Also, plot c3 (a white star) on line C simply indicates the combustion fluctuation in all of the cylinders when external EGR is not being executed and the target air-fuel ratio is rich-corrected to the predetermined value Z1. As is evident from the drawing, the combustion fluctuation in all of the cylinders is on the good side of an allowable limit α.

From the results of the research conducted by the inventors, it is evident that it is not preferable to perform a rich correction when external EGR is being executed, in the same way as when external ECR is not being executed.

That is, in FIG. 6, plots b1 (a solid black circle), b2 (a solid black circle), and b3 (a solid black star) on line B correspond to plots a1, a2, and a3 on line A, respectively. Also, plot d3 (a solid black star) on line D corresponds to plot c3 on line C. As shown by plot d3, the combustion fluctuation in all of the cylinders deteriorates beyond the allowable limit a of combustion fluctuation when the target air-fuel ratio is corrected to the same value Z1 as when external EGR is not being executed, when external EGR is being executed. Also, torque fluctuation reaches an unacceptable level, so vibration increases and drivability consequently deteriorates. Emissions also deteriorate at the same time.

That is, a problem in which the combustion fluctuation exceeds the allowable limit a arises when a rich correction of the same amount as when external EGR is not executed is performed when external EGR is executed.

Therefore, to solve this problem, in this example embodiment, a rich correction such as that described below is performed in order to perform a suitable rich correction when there is an air-fuel ratio imbalance among the cylinders.

In brief, the value of the ratio imbalance at which a rich correction is started changes depending on whether external EGR is being executed. More specifically, the value of the ratio imbalance at which a rich correction is started is larger when external EGR is being executed than it is when external EGR is not being executed.

Figure 7:
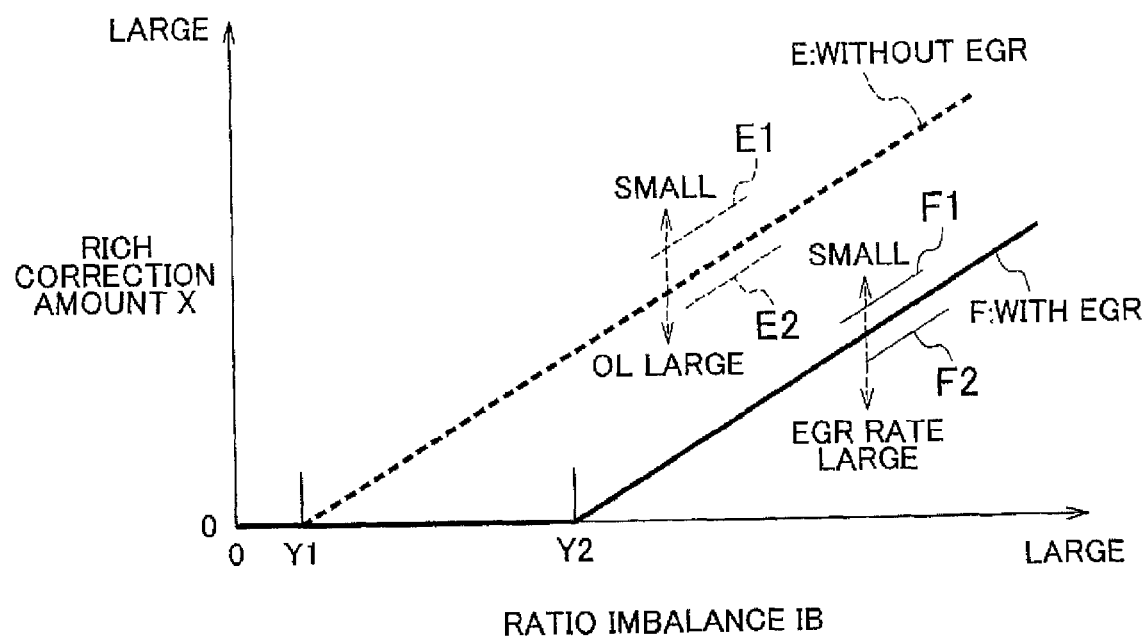
FIG. 7 is a graph showing the relationship between a ratio imbalance and a rich correction amount.

This point will now be described with reference to FIG. 7. FIG. 7 is a graph showing the relationship between the ratio imbalance IB and a rich correction amount X. In the drawing, line E (the broken line) indicates the relationship when EGR is not being executed, and line F (the solid line) indicates the relationship when EGR is being executed. These relationships are stored in advance in the ECU 20 in the form of a map (or a function; the same hereinafter).

In this example embodiment, the ECU 20 detects a rich deviation in which the air-fuel ratio of a portion of the cylinders (one cylinder in particular) is off to the rich side of stoichiometric. When this rich deviation is detected, the ECU 20 calculates a ratio imbalance IB that is a parameter indicative of the amount of the rich deviation. For example, when there is a rich deviation in cylinder 41 such as that shown in FIG. 4, the ECU 20 detects this rich deviation by a method that will be described later, and calculates the ratio imbalance TB of the cylinder #1 by a method that will also be described later.

Next, the ECU 20 calculates a rich correction amount X that corresponds to the ratio imbalance IB from a relationship (i.e., a map) such as that shown in FIG. 7.

Then the ECU 20 sets a new target air-fuel ratio by subtracting the obtained rich correction amount X from the stoichiometric air-fuel ratio (14.5), and corrects the target air-fuel ratio to the rich side. The rich correction amount X is a value less than 1, for example.

As is evident from line E in FIG. 7, when EGR is not being executed, the rich correction amount X is zero when the ratio imbalance IB is within a range from zero up until, but not including, a first predetermined value Y1. The first predetermined value Y1 is a value that is slightly larger than zero. This range is a so-called undetectable area within which error is allowed. However, this kind of undetectable area may also be omitted. Then when the ratio imbalance IB becomes equal to or greater than first predetermined value Y1, the rich correction amount X becomes greater than zero. This first predetermined value Y1 is a value of the ratio imbalance at which a rich correction is started when EGR is not being executed, that is, a correction-starting value when EGR is not being executed. As the ratio imbalance IB increases from the first predetermined value Y1, the rich correction amount X also increases, so the target air-fuel ratio is corrected more to the rich side.

In contrast, as is evident from line F in FIG. 7, the tendency is the same when EGR is being executed as it is when EGR is not being executed, but differs in the following way from when EGR is not being executed. That is, the rich correction amount X when the ratio imbalance IB is within a range from zero up until, but not including, a second predetermined value Y2 is zero, but the second predetermined value Y2 differs from the first predetermined value Y1, with the second predetermined value Y2 being greater than the first predetermined value Y1. Then, when the ratio imbalance IB becomes equal to or greater than the second predetermined value Y2, the rich correction amount X becomes greater than zero. This second predetermined value Y2 is a value of the ratio imbalance at which the rich correction is started when EGR is being executed, that is, a correction-starting value when EGR is being executed.

Therefore, when EGR is being executed, a correction is not made until there is a larger rich deviation than there is when EGR is not being executed. Accordingly, when the rich deviation is relatively small, or more specifically, when the ratio imbalance IB is less than the second predetermined value Y2, the correction is stopped.

Also, as the ratio imbalance IB increases from the second predetermined value Y2, the rich correction amount X also increases. However, at this time the rich correction amount X with respect to a given ratio imbalance IB is smaller than it is when EGR is not being executed. Accordingly, with a given ratio imbalance IB (i.e., when the ratio imbalance IB is the same), the target air-fuel ratio is corrected less to the rich side when EGR is being executed than it is when EGR is not being executed.

Figure 8:
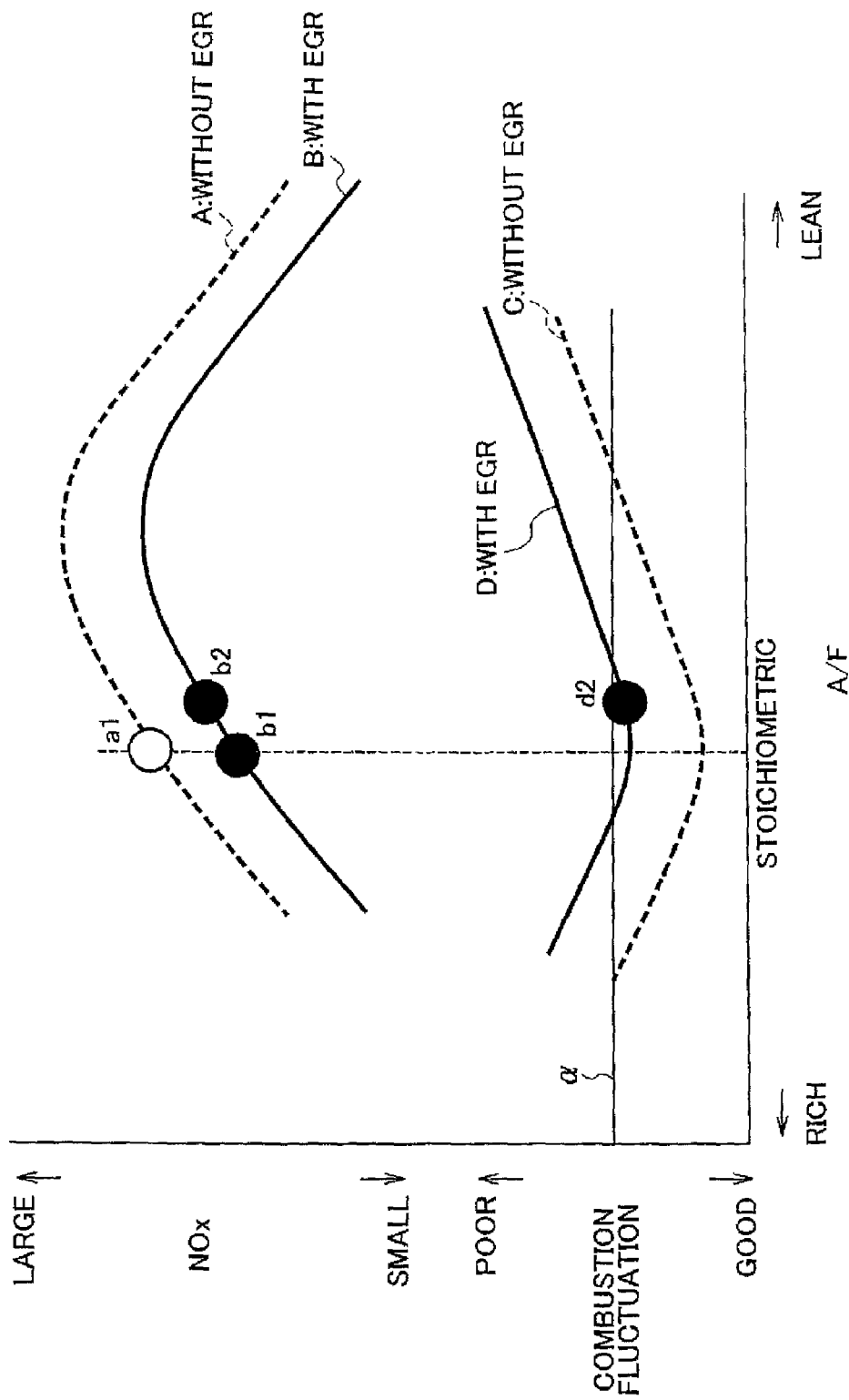
FIG. 8 is a graph illustrating a rich correction when a rich deviation is small.
Figure 9:
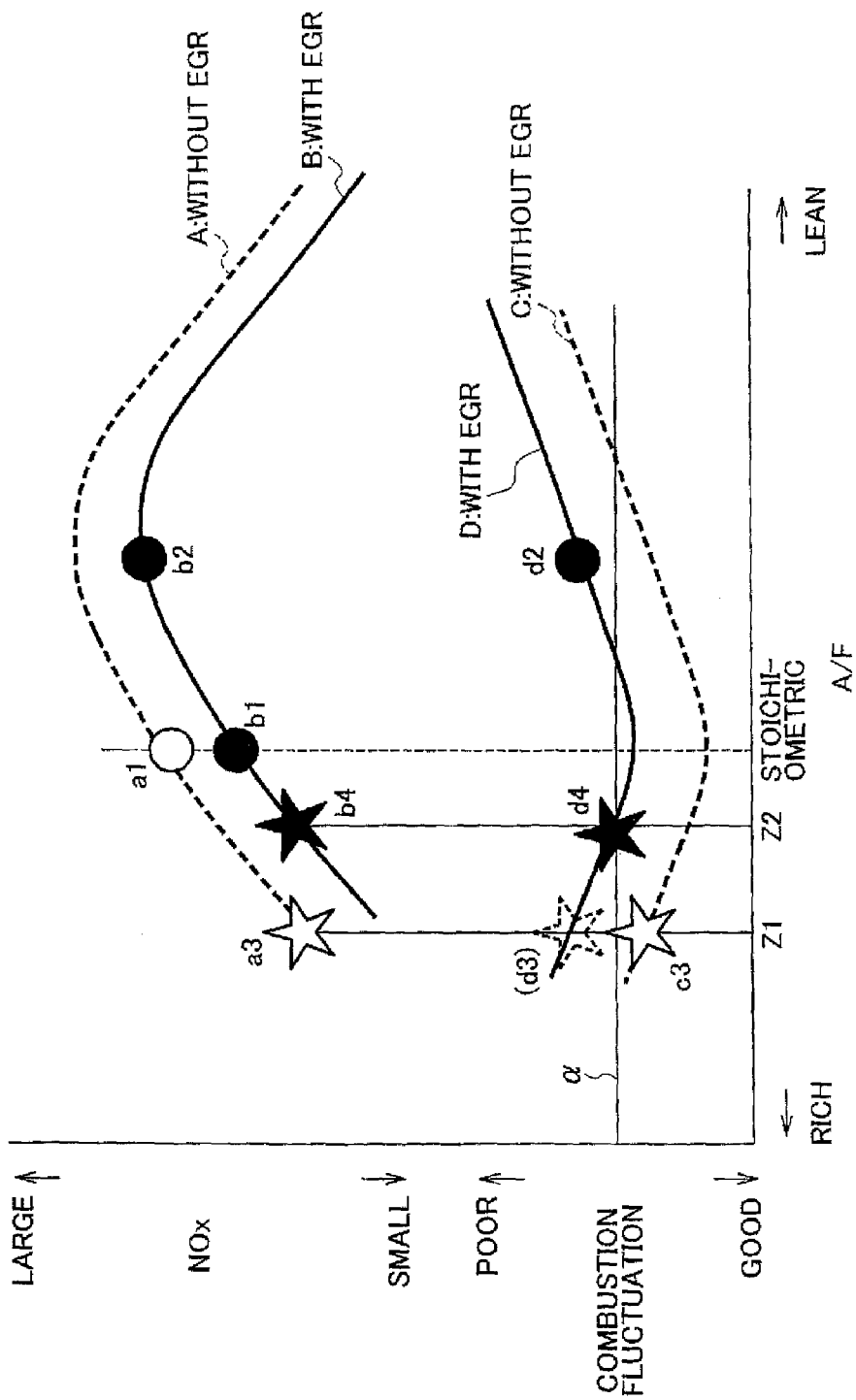
FIG. 9 is a graph illustrating a rich correction when a rich deviation is large.

When such a rich correction is performed, the results are as shown in FIGS. 8 and 9 when EGR is being performed.

First, as shown in FIG. 8, when the rich deviation is small, i.e., when the ratio imbalance IB is small (i.e., IB<Y2), the plot related to the NOx discharge amount of the normal cylinders shifts from b1 at, stoichiometric to b2 that is slightly off to the lean side, as a result of the main air-fuel ratio feedback control. The NOx discharge amount of the normal cylinders at this time is less than the NOx discharge amount indicated by plot a1 at stoichiometric and when EGR is not being executed. Also, the combustion fluctuation of at least the normal cylinders is equal to or less than the allowable limit α of combustion fluctuation, as shown by plot d2. Accordingly, neither the NOx discharge amount nor the combustion fluctuation will reach a level perceived as problematic, so in this case, a rich correction is stopped without being performed.

Next, as shown in FIG. 9, when the rich deviation is large, i.e., when the ratio imbalance IB is large (i.e., IB≥Y2), the plot related to the NOx discharge amount of the normal cylinders shifts from b1 at stoichiometric to b2 that is largely off to the lean side, as a result of the main air-fuel ratio feedback control. The NOx discharge amount of the normal cylinders at this time is greater than the NOx discharge amount indicated by plot a1 at stoichiometric and when EGR is not being executed. Also, if a rich correction of the same amount as when EGR is not being executed were performed and the target air-fuel ratio were made a value Z1 that is largely off to the rich side of stoichiometric, the combustion fluctuation of all of the cylinders would exceed the allowable limit α of combustion fluctuation as shown by hypothetical plot d3. It should be noted that when EGR is not being executed, a rich correction in which the target air-fuel ratio is the value Z1 will not be a problem, as shown by plots a3 and c3.

However, in this example embodiment, only a rich correction that is smaller than that when EGR is not being executed is performed, so the target air-fuel ratio is made a value Z2 that is off from stoichiometric less than the value Z1 is. Accordingly, the combustion fluctuation of all of the cylinders becomes equal to or less than the allowable limit α of the combustion fluctuation, as shown by plot d4, so combustion fluctuation is able to be suppressed to within the allowable limit. The NOx discharge amount of all of the cylinders when the target air-fuel ratio is the value Z2 is simply denoted by plot b4.

In this way, according to this example embodiment, the correction-starting value changes between Y1 and Y2 depending on whether external EGR is being executed. Therefore, a suitable rich correction according to whether external EGR is being executed is performed, and the timing at which the correction is started (i.e., the correction-starting timing) can be changed according to whether external EGR is being executed. Thus, an appropriate balance between the combustion fluctuation and the NOx discharge amount when a rich correction is executed can be achieved.

Also, the correction-starting value Y2 when external EGR is being executed is made larger than the correction-starting value Y1 when external EGR is not being executed. Therefore, the correction-starting timing is delayed when external EGR is being executed compared with when external EGR is not being executed, and the correction can be stopped when external EGR is being executed and the ratio imbalance is small (i.e., IB<Y). This also enables an even more appropriate balance between the combustion fluctuation and the NOx discharge amount when a rich correction is executed to be achieved.

Further, the rich correction amount of a rich correction changes according to the value of the ratio imbalance and whether external EGR is being executed. Also, the rich correction amount with respect to a given ratio imbalance is made smaller when external EGR is being executed than it is when external EGR is not being executed. Therefore, the target air-fuel ratio is made leaner (see Z1 and Z2 in FIG. 9) when external EGR is being executed than it is when external EGR is not being executed, thereby preventing the air-fuel ratio from becoming too rich, which in turn makes it possible to prevent combustion fluctuation from deteriorating.

The characteristic lines A, B, C, and D as shown in FIG. 6 change according to the EGR rate. Therefore, it is preferable to also change the relationship or map as shown in FIG. 7 according to the EGR rate. This change is made in this example embodiment.

For example, as shown in FIG. 6, the NOx discharge amount characteristic line B when external EGR is being executed makes a parallel shift to the upper side in the drawing so as to move closer to the NOx discharge amount characteristic line A when external EGR is being executed, as the external EGR rate decreases (see B1 in the drawing), and makes a parallel shift to the lower side in the drawing so as to move away from the NOx discharge amount characteristic line A when external EGR is not being executed as the external EGR rate increases (see B2 in the drawing).

Therefore, as shown in FIG. 7, line F when external EGR is being executed makes a parallel shift to the upper side in the drawing so as to move closer to line E when external EGR is not being executed as the external EGR rate decreases (see F1 in the drawing), and makes a parallel shift to the lower side in the drawing so as to move away from line E when external EGR is not being executed, as the external EGR rate increases (see F2 in the drawing).

As a result, when external EGR is being executed, the rich correction amount X becomes smaller as the external EGR rate increases. That is, with respect to a given ratio imbalance IB, the rich correction amount X is changed or corrected to become smaller as the external EGR rate increases, and is changed or corrected to become larger as the external EGR rate decreases.

Figure 10:
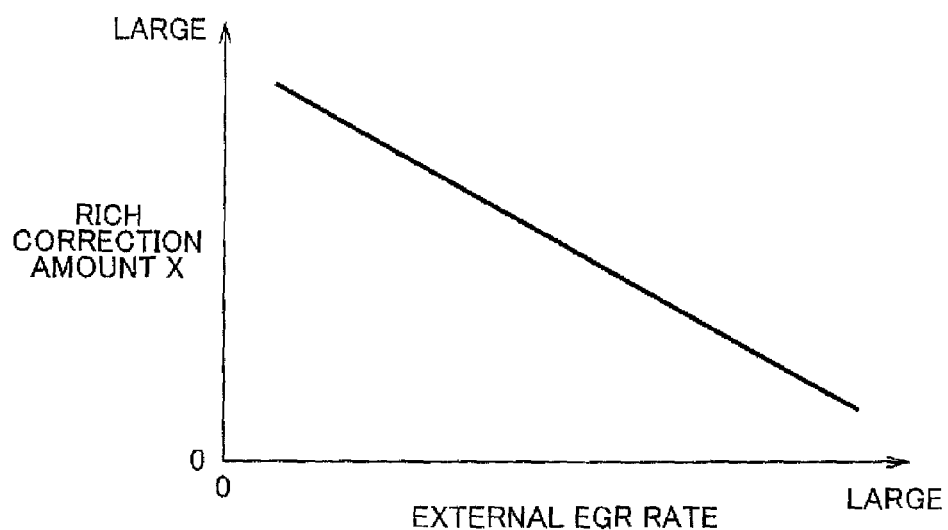
FIG. 10 is a graph showing the relationship between an external EGR rate and a rich correction amount.

FIG. 10 is a view showing the manner of this kind of change or correction. As shown in drawing, the rich correction amount X decreases as the external EGR rate increases.

The relationship between the external EGR rate and the correction value that corrects the rich correction amount X may be mapped out beforehand, and at the time of this change, a correction value corresponding to the actual external EGR rate (or more specifically, the target EGR rate) may be calculated from the map, and the reference line F in FIG. 7 may be corrected by this correction value.

On the other hand, as shown in FIG. 6, the combustion fluctuation characteristic line D when external EGR is being executed makes a parallel shift to the lower side in the drawing so as to move closer to the combustion fluctuation characteristic line C when external EGR is not being executed, as the external EGR rate decreases (see D1 in the drawing), and makes a parallel shift to the upper side in the drawing so as to move away from the combustion fluctuation characteristic line C when external EGR is not being executed, as the external EGR rate increases (see D2 in the drawing). As a result, as the external EGR rate decreases, a margin of the combustion fluctuation when the air-fuel ratio is off from stoichiometric (i.e., the range that is equal to or less than the allowable limit α) increases, so the correction-starting value Y2 decreases (i.e., the correction-starting timing becomes earlier), thereby enabling the rich correction amount X to be increased with respect to a given ratio imbalance. At this point, the line F1 shown in FIG. 7 is also aligned. That is, as the external EGR rate decreases, the correction-starting value Y2 decreases, so the rich correction amount X with respect to a given ratio imbalance increases.

Next, as shown in FIG. 6, the NOx discharge amount characteristic line A when external EGR is not being executed makes a parallel shift to the upper side in the drawing so as to move away from the NOx discharge amount characteristic line B when external EGR is being executed, as the overlap (OL) decreases (see A1 in the drawing), and makes a parallel shift to the lower side in the drawing so as to move closer to the NOx discharge amount characteristic line B when external EGR is being executed, as the overlap increases (see A2 in the drawing).

Figure 11:
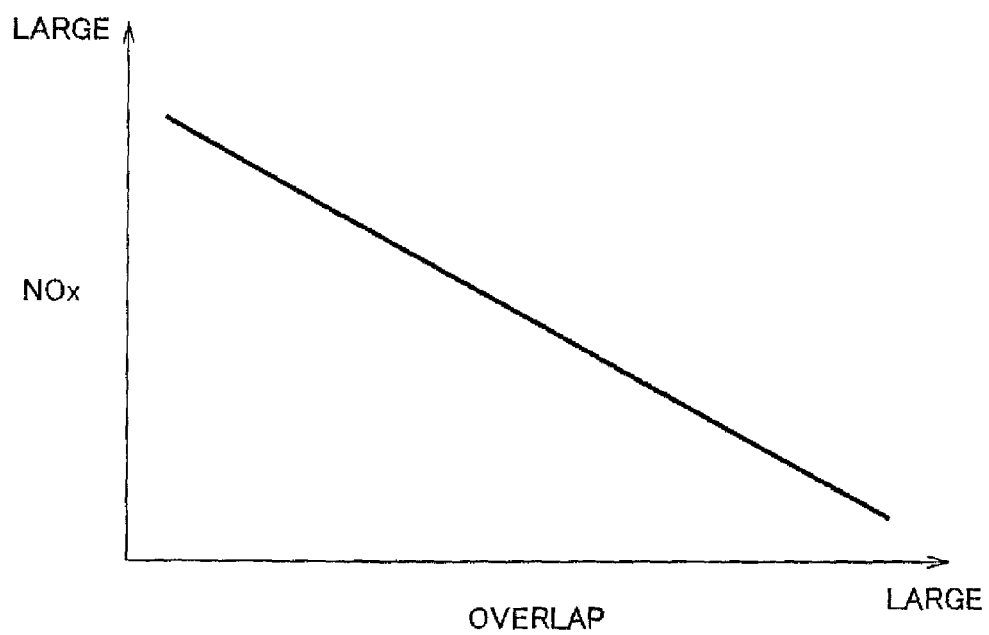
FIG. 11 is a graph showing the relationship between overlap and the NOx discharge amount.

As shown in FIG. 11, as the overlap (OL) increases, the internal EGR rate increases and the NOx discharge amount decreases. Accordingly, the characteristics become as described below.

Therefore, as shown in FIG. 7, line E when external EGR is not being executed makes a parallel shift to the upper side in the drawing so as to move away from line F when external EGR is being executed, as the overlap decreases (see E1 in the drawing), and makes a parallel shift to the lower side in the drawing so as to move closer to line F when external EGR is being executed, as the overlap increases (see E2 in the drawing).

As a result, when external EGR is not being executed, the rich correction amount X decreases as the overlap increases. That is, with respect to the same ratio imbalance IB, the rich correction amount X is changes or corrected to become smaller as the overlap increases, and is changed or corrected to become larger as the overlap decreases.

Figure 12:
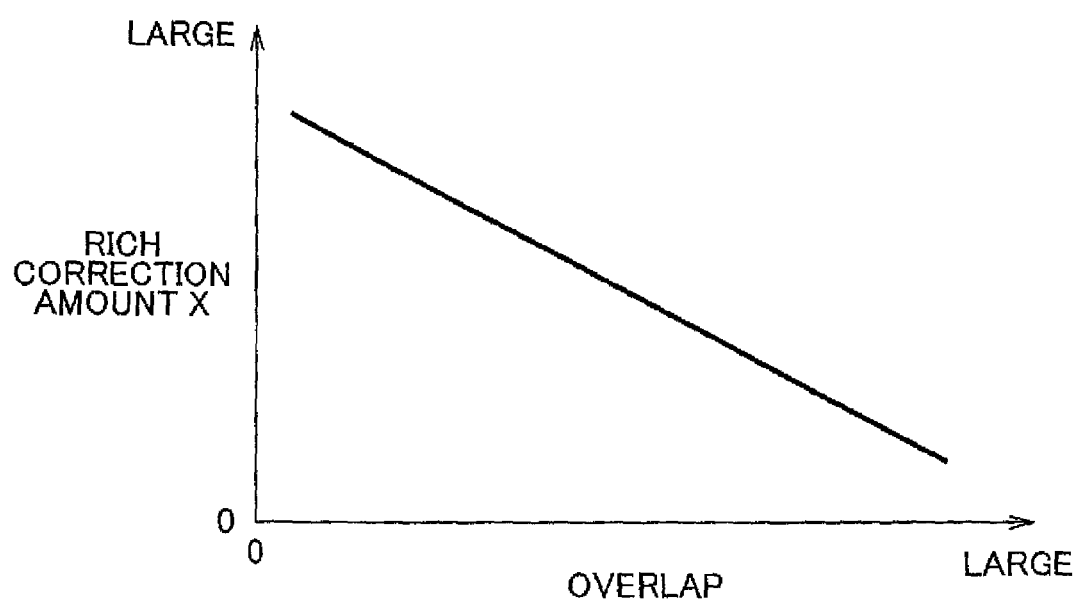
FIG. 12 is a graph showing the relationship between the overlap and the rich correction amount.

FIG. 12 shows the manner of this kind of change or correction. As shown in the drawing, the rich correction amount X decreases as the overlap increases.

The relationship between the overlap and the correction value that corrects the rich correction amount X may be mapped out beforehand, and at the time of this change, a correction value corresponding to the actual overlap may be calculated from the map, and the reference line E in FIG. 7 may be corrected by this correction value.

On the other hand, as shown in FIG. 6, the combustion fluctuation characteristic line C when external EGR is not being executed makes a parallel shift to the lower side in the drawing so as to move away from the combustion fluctuation characteristic line D when external EGR is being executed, as the overlap decreases (see C1 in the drawing), and makes a parallel shift to the upper side in the drawing so as to move closer to the combustion fluctuation characteristic line D when external EGR is being executed, as the overlap increases (see C2 in the drawing). When external EGR is not being executed, the margin of the combustion fluctuation when the air-fuel ratio is off from stoichiometric is originally sufficient, so a change in this characteristic line results in almost no deterioration in the combustion fluctuation.

When EGR is being executed, the rich correction amount may be changed and corrected together based on the overlap.

Figure 13:
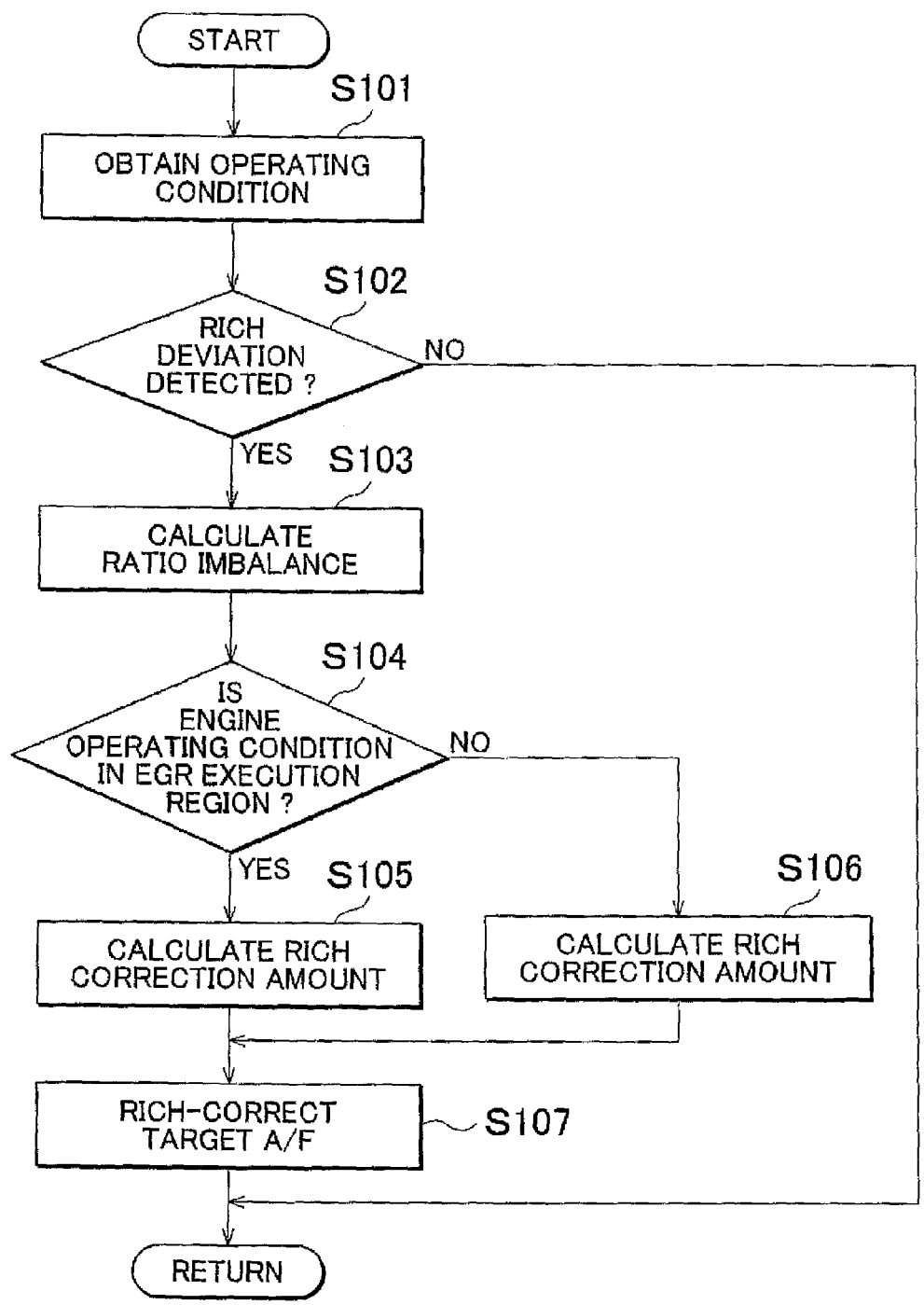
FIG. 13 is a flowchart of a rich correction routine.

Next, a rich correction routine will be described with reference to FIG. 13. This rich correction routine is executed repeatedly at predetermined calculation cycles (such as every 4 milliseconds).

First in step S101, various parameter values indicative of the operating condition of the engine 1 are obtained. At least the engine speed, the engine load, the coolant temperature, the target EGR rate, and the overlap are included in these parameters. The engine load is able to be calculated based on the accelerator operation amount or the intake air amount.

Next in step S102, it is determined whether a rich deviation from stoichiometric of a portion of the cylinders (one cylinder in particular), such as that shown in FIG. 4, is detected. This rich deviation is detected according to the method described below. In this example embodiment, the air-fuel ratio of each cylinder is detected individually based on the output of the catalyst upstream sensor 17. The exhaust gas discharged from each cylinder contacts the catalyst upstream sensor 17 one after the other with a time delay, so in response to this, the output of the catalyst upstream sensor 17 also changes to a value that corresponds to the air-fuel ratio of the exhaust gas of each cylinder.

Figure 14:
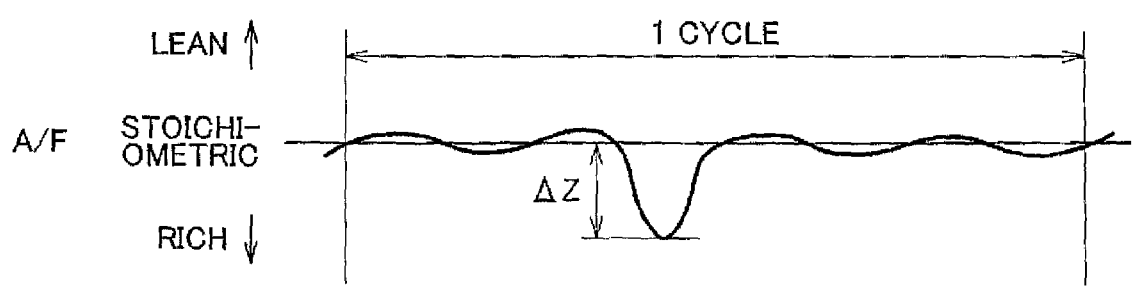
FIG. 14 is a time chart showing the change in output of the catalyst upstream sensor.

FIG. 14 is a view of the change in the output of this catalyst upstream sensor 17 converted to an air-fuel ratio A/F. The ECU 20 ascertains the cylinder that discharged the exhaust gas on which the current output of the catalyst upstream sensor 17 is based, using a cylinder discriminating function or the like of the ECU 20. If there is a sensor output that deviates largely (i.e., is equal to or greater than a predetermined value) to the rich side of stoichiometric within one engine cycle (=720° CA) that is one unit, the ECU 20 determines that there is a rich deviation in the cylinder corresponding to this sensor output. Conversely, if there is not a sensor output that deviates largely to the rich side from stoichiometric, then the ECU 20 determines that there is no rich deviation.

If a rich deviation is not detected in step S102, this cycle of the routine ends. If, on the other hand, a rich deviation is detected, the process proceeds on to step S103.

In step S103, the ratio imbalance of the cylinder with the rich deviation is calculated. More specifically, as shown in FIG. 14, the peak farthest on the rich side of the sensor output corresponding to the cylinder with the rich deviation is detected, and the ratio imbalance IB is calculated from the expression $IB=\Delta Z/14.5(\%)$ based on the difference $\Delta Z$ between the converted air-fuel ratio of this peak and stoichiometric.

The ratio imbalance can also be calculated based on the correction amount of the main air-fuel ratio feedback control. That is, when there is a rich deviation, the overall air-fuel ratio is corrected to the lean side by the main air-fuel ratio feedback control, as shown in FIG. 5. The lean correction amount increases as the rich deviation increases, so the ratio imbalance can be calculated based on this lean correction amount. For example, when a lean correction corresponding to an overall ratio imbalance of 5% is performed, the ratio imbalance of the cylinder with the rich deviation may be calculated as 5×4=20%. The relationship between the lean correction amount and the ratio imbalance may be stored in advance in the ECU 20 in the form of a map, and the ratio imbalance corresponding to the actual lean correction amount may be calculated from this map.

Figure 3:
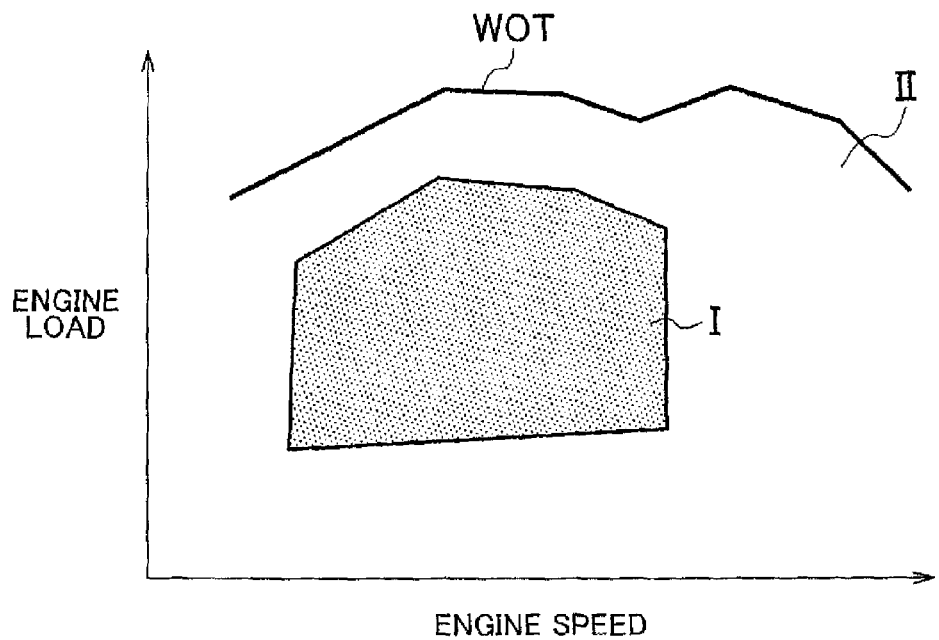
FIG. 3 is an EGR control map.

Next, in step S104, it is determined whether the current engine operating condition is in EGR execution region I such as that shown in FIG. 3. If the current engine operating condition is in EGR execution region I, i.e., if external EGR is being executed, the process proceeds on to step S105, where the rich correction amount X is calculated according to the relationship of line F (or F1 or F2) in FIG. 7, based on the values of the ratio imbalance calculated in step S103 and the target EGR rate obtained in step S101.

If, on the other hand, the current engine operating condition is not in EGR execution region I, i.e., if external EGR is not being executed, the process proceeds on to step S106, where the rich correction amount X is calculated according to the relationship of line E (or E1 or E2) in FIG. 7, based on the values of the ratio imbalance calculated in step S103 and the overlap obtained in step S101.

Once the rich correction amount X is calculated in this way, the process proceeds on to step S107, where the target air-fuel ratio is rich-corrected. That is, a value obtained by subtracting the rich correction amount X from stoichiometric (i.e., 14.5) is set as the target air-fuel ratio after the correction (also referred to as the "post-correction target air-fuel ratio").

Then this cycle of the routine ends, and the main and auxiliary air-fuel ratio feedback controls are thereafter executed using the post-correction target air-fuel ratio. As a result, air-fuel ratio feedback control can be performed while suitably balancing the NOx discharge amount with the combustion fluctuation, so a suitable balance between emissions and drivability can be achieved.

Heretofore, a preferable example embodiment of the invention has been described in detail, but other various example embodiments of the invention are also possible. For example, an example embodiment in which the changing of the rich correction amount based on at least one of the external EGR rate and the overlap is omitted is also possible. The target air-fuel ratio does not necessarily have to match stoichiometric, but may be modified as appropriate. Also, a parameter other than the ratio imbalance may also be used for the parameter indicative of the amount of rich deviation. For example, a sine-wave-shaped fluctuation in the air-fuel ratio sensor output, in which one engine cycle is one cycle, may increase as the rich deviation increases, so a value (i.e., a slope, an amplitude, a peak difference or the like) that is based on this output fluctuation may also be used for this parameter.

The example embodiments of the invention is not limited to the example embodiments described above. That is, the invention includes all modifications, applications, and equivalents that are within the scope of the invention as defined by the scope of the claims for patent. Therefore, the scope of the invention shall not be construed to be limited, but may instead be applied to other appropriate technology within the scope of the invention.

What is claimed is:

1. A control apparatus of a multiple cylinder internal combustion engine, comprising:
   an EGR apparatus that executes external EGR that circulates exhaust gas inside of an exhaust passage to an intake passage;
   an air-fuel ratio control apparatus that feedback-controls an air-fuel ratio such that an air-fuel ratio of the exhaust gas comes to match a predetermined target air-fuel ratio;
   a detecting device that detects a rich deviation in which an air-fuel ratio of a portion of cylinders is off to a rich side from the target air-fuel ratio;
   a calculating device that calculates a parameter indicative of an amount of the rich deviation, when the rich deviation is detected by the detecting device;
   a rich correcting device that corrects the target air-fuel ratio to the rich side according to the parameter calculated by the calculating device; and
   a changing device that changes a value of the parameter at which the rich correction is started, according to whether the external EGR is being executed.

2. The control apparatus according to claim 1, wherein the changing device makes the value of the parameter at which the rich correction is started larger when the external EGR is being executed than when the external EGR is not being executed.

3. The control apparatus according to claim 1, wherein the changing device changes the rich correction amount of the rich correction according to whether the external EGR is being executed and the value of the parameter.

4. The control apparatus according to claim 3, wherein the changing device makes the rich correction amount with respect to the parameter smaller when the external EGR is being executed than when the external EGR is not being executed.

5. The control apparatus according to claim 3, wherein the changing device changes the rich correction amount according to an external EGR rate when the external EGR is being executed.

6. The control apparatus according to claim 5, wherein the changing device makes the rich correction amount smaller as the external EGR rate increases.

7. The control apparatus according to claim 3, further comprising:
a variable device that varies an overlap of an intake valve and an exhaust valve,
wherein the changing device changes the rich correction amount according to the overlap when the external EGR is not being executed.

8. The control apparatus according to claim 7, wherein the changing device makes the rich correction amount smaller as the overlap increases.

9. A control method of a multiple cylinder internal combustion engine, comprising:
executing external EGR that circulates exhaust gas in an exhaust passage to an intake passage;
feedback-controlling an air-fuel ratio such that an air-fuel ratio of the exhaust gas comes to match a predetermined target air-fuel ratio;
detecting a rich deviation in which an air-fuel ratio of a portion of cylinders is off to a rich side from the target air-fuel ratio;
calculating a parameter indicative of an amount of the rich deviation, when the rich deviation is detected;
correcting the target air-fuel ratio to the rich side according to the calculated parameter; and
changing a value of the parameter at which the rich correction is started, according to whether the external EGR is being executed.

* * * * *